(No Model.)
H. B. RIEHLÉ & M. F. HATCHER.
MARBLE MOLDING MACHINE.
No. 362,999. Patented May 17, 1887.
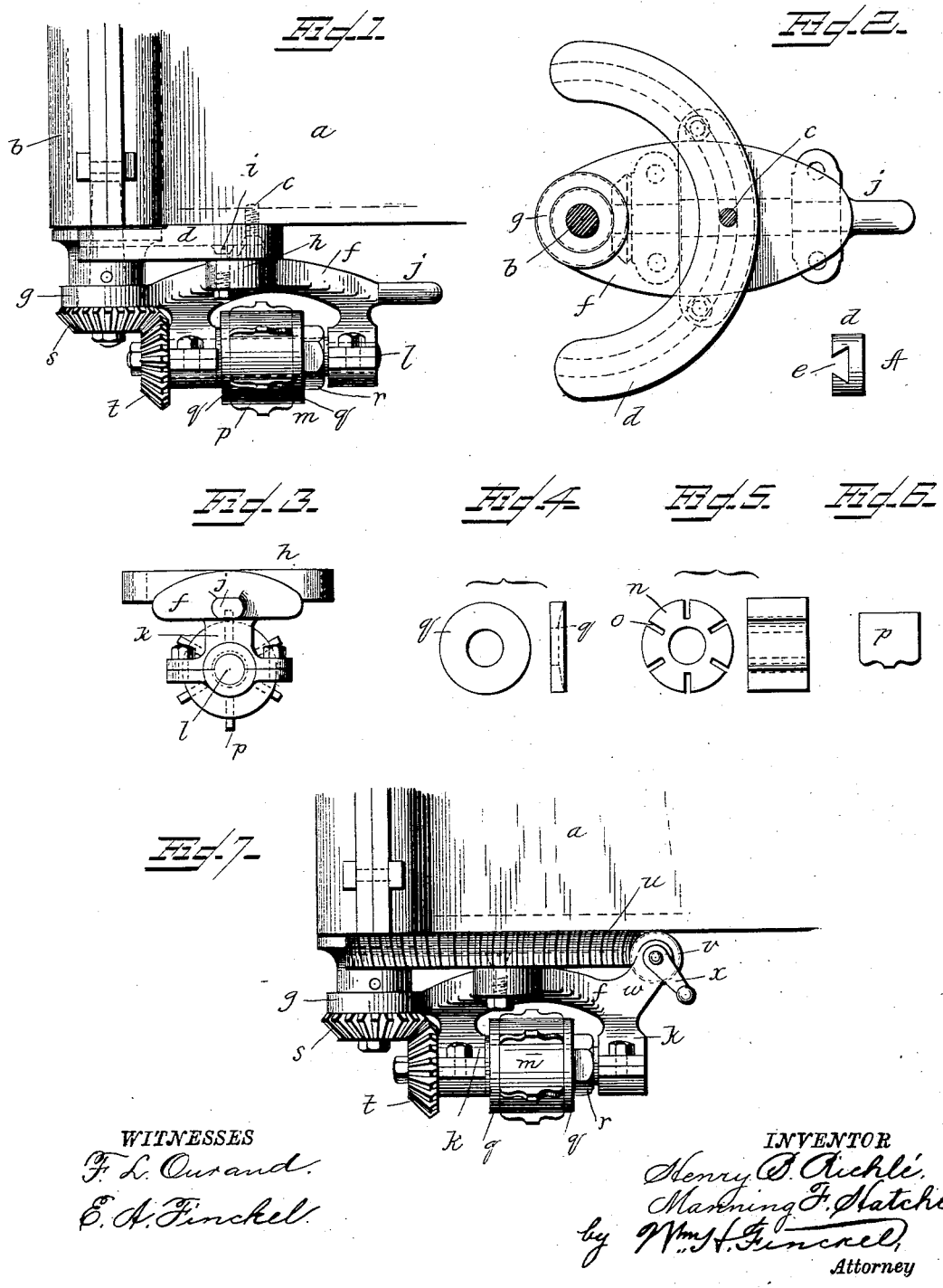
WITNESSES
F. L. Ourand.
E. A. Finckel.
INVENTOR
Henry B. Riehlé,
Manning F. Hatcher
by Wm. H. Finckel,
Attorney

UNITED STATES PATENT OFFICE.

HENRY B. RIEHLÉ AND MANNING F. HATCHER, OF PHILADELPHIA, PENNSYLVANIA; SAID HATCHER ASSIGNOR TO SAID RIEHLÉ.

MARBLE-MOLDING MACHINE.

SPECIFICATION forming part of Letters Patent No. 362,999, dated May 17, 1887.

Application filed August 24, 1886. Serial No. 211,729. (No model.)

*To all whom it may concern:*

Be it known that we, HENRY B. RIEHLÉ and MANNING F. HATCHER, citizens of the United States, residing at Philadelphia, in the county of Philadelphia and State of Pennsylvania, have invented a certain new and useful Improvement in Marble-Molding Machines, of which the following is a full, clear, and exact description.

This invention relates to that class of stone-pressing machines which have for their object the working of slabs of stone into useful shapes which are more or less ornamental.

The invention consists in a cutter and a carriage therefor constructed and arranged to operate substantially as hereinafter particularly set forth and claimed.

In the accompanying drawings, in the several figures of which like parts are similarly designated, Figure 1 is a side elevation of a portion of the movable head carrying the cutter-driving spindle, the cutter, and its carriage. Fig. 2 is a top plan view in the plane of the lowermost surface of the movable head. Fig. 3 is an end view of the cutter and its carriage. Figs. 4, 5, and 6 are details of the cutter, and Fig. 7 is a side elevation of a modification of the operating mechanism of the cutter-carriage.

The head $a$, which carries the cutter-driving spindle $b$, may be arranged in any suitable frame, and is movable therein in any usual manner to adjust the cutter vertically to the height of the stone being worked. To the under side of the head $a$ is secured horizontally in any suitable manner—as by a bolt, $c$—a guideway, $d$, made as a segment of a circle, and having a dovetail groove, $e$, on its under side, as shown more particularly at A, to the right of Fig. 2.

$f$ is a carriage provided with a bearing, $g$, journaled to the lower end of the spindle $b$, so as to rotate in a horizontal plane upon said spindle. This carriage has a flat surface and lateral projections $h$ therefrom, which fit against the lower grooved side of the segment $d$, so as to be capable of movement horizontally against said segment, the said flat bed and projections being preferably curved to the arc of the segment. The carriage $f$ is connected to the segment $b$ by means of bolts $i$, the heads of which enter and engage the groove $e$ of said segment. By this construction the carriage may be rotated upon the spindle to the extent of the segment or guideway $d$, a handle, $j$, being provided on the carriage, if desired, for facilitating its movement. Half journal-boxes $k$ project from the lower side of the carriage, the other halves of said journal-boxes being removable and secured thereto by bolts or screws in any usual manner. In these journal-boxes of the carriage is secured a horizontal shaft, $l$, which receives between the journal-boxes the cutter $m$. This cutter consists of a head, $n$, having longitudinal peripheral notches or sockets $o$, in which are fitted the tool-blades $p$, (see details Figs. 5 and 6,) these blades being shaped for molding, sawing, and other operations. The blades are clamped in the head $n$ by washers $q$, arranged at each end of said head on the shaft $l$, and a nut or nuts, $r$, the washers being undercut on the face next adjacent the cutter-head, as indicated in Fig. 4.

The lower end of the spindle $b$ is provided with a beveled pinion, $s$, which meshes with a beveled pinion, $t$, on the shaft $l$, and said spindle, being driven at its other end in any usual manner, imparts rotary motion to the shaft $l$, and, consequently, the cutter $m$.

The cutter-carriage swings on the main spindle as a pivot for the purpose, among others, of running out curved or sunken corners of moldings in stone. When it is desired to retain the carriage in any position, the bolts $i$ may be tightened up so as to bind the carriage to the segment $d$.

In order to more accurately and uniformly swing the carriage upon the spindle, we may worm-tooth the outer vertical edge of the segment $d$, as shown at $u$ in Fig. 7, and provide a worm, $v$, on the carriage, which meshes with said worm-toothed segment. The worm $v$ is supported in arms $w$, projecting from the carriage, and said worm may be conveniently operated by a crank or handle, $x$. In such a construction the bolts $i$, if employed at all, will serve simply to connect the segment and carriage.

With this construction of stone-cutting device we are enabled to cut moldings in slabs of marble or stone away from the edges, and we are also enabled to cut through such slabs and divide them neatly into any number of parts. Such a cutting apparatus, combined with the adjustable slab-holding mechanism set forth in the application No. 160,094, filed March 25, 1885, will produce a machine capable of performing a very large variety of work, although it will be understood that we do not limit the application of our invention to that single style of machine.

What we claim is—

1. The main driving-spindle, combined with a cutter-carriage pivoted thereto, and thereby adapted to rotate thereupon, and a guideway for such carriage, substantially as described.

2. A cutter-carriage for stone-molding machines, pivoted to a main driving spindle so as to rotate about the same in a horizontal plane, a guideway for such carriage, a horizontal shaft supported in said carriage, and a cutter secured to said shaft and rotating therewith, and means to rotate said shaft, substantially as described.

3. A main driving-spindle provided with a bevel-gear at its lower end, a cutter-carriage pivoted to said spindle, a shaft supported by said carriage, a cutter secured to said shaft, and a bevel-gear on said shaft driven from the bevel-gear on the spindle, substantially as described.

4. The main driving-spindle, a cutter-carriage pivoted to said spindle so as to rotate thereupon in a horizontal plane, a guideway for said carriage, and means, substantially as described, for connecting the guideway and carriage and permitting the movement of said carriage to any desired point on said guideway, substantially as described.

In testimony whereof we have hereunto set our hands this 11th day of November, A. D. 1885.

HENRY B. RIEHLÉ.
MANNING F. HATCHER.

Witnesses:
WM. H. FINCKEL,
JOHN C. GALLEN.

It is hereby certified that Letters Patent No. 362,999, granted May 17, 1887, upon the application of Henry B. Richlé and Manning F. Hatcher for an improvement in "Marble Molding Machines" was erroneously issued to Henry B. Richlé; that said Letters Patent should have been issued jointly to *Henry B. Richlé and Frederick A. Richlé*, said Frederick A. Richlé being assignee of the entire interest of said Manning F. Hatcher, and that the said Letters Patent should be read with this correction therein that the same may conform to the record of the case in the Patent Office.

Signed, countersigned, and sealed this 24th day of May, A. D. 1887.

[SEAL.]

D. L. HAWKINS,
*Acting Secretary of the Interior.*

Countersigned:

BENTON J. HALL,
*Commissioner of Patents.*